United States Patent Office 3,809,779
Patented May 7, 1974

3,809,779
UREA SUPPLEMENTED PAUNCH CONTENT
WITH TRICHLOROACETIC ACID PROTEIN
PRECIPITANT
Kyu-Yawp Lee, 766 Leawood Drive,
Omaha, Nebr. 68154
No Drawing. Filed Apr. 2, 1973, Ser. No. 346,734
Int. Cl. A23k 1/00
U.S. Cl. 426—335                                      3 Claims

ABSTRACT OF THE DISCLOSURE

The conversion of ruminant paunch content into a valuable and useful product and the reduction of highly undesirable odors therefrom by treating it with trichloroacetic acid and urea.

SUMMARY AND BACKGROUND OF THE INVENTION

This invention relates to the treatment of ruminant paunch content and relates more particularly to a new and improved method for processing paunch content in order to precipitate proteins and other nutrients in the paunch content and recover them in dewatered rough residue and ensiled for anaerobic condition. The present invention is related to the invention described in pending patent Ser. No. 269,949, filed on July 10, 1972 and follows general techniques described therein. The present new and improved method differs from said pending patent in that the present method utilizes a different chemical with less processing steps thereby reducing processing time and cost for a better quality product.

Some of the problems associated with paunch content or paunch manure as it is commonly called in meat packing centers is its continuous flow in large quantities and very offensive odors. It is estimated that nearly two million tons of such paunch content and nearly fifty million gallons of paunch liquid washings are produced and possibly discharged into our streams annually. More detailed facts and figures are cited in Stahler Pat. No. 3,545,977 and Whitting Pat. No. 3,563,758. Land, water, and air pollution from paunch content in meat packing centers such as Omaha, Nebraska is tremendous.

In order to be economically feasible a technique must be simple and cost reasonable enough so that labor, equipment, chemicals, and other overhead costs are compensated for from the sale of such a product. Furthermore, the technique is such that it will not transfer one form of pollution to another form such as from land to water pollution by discharging harsh chemicals used in the process.

Paunch content which is about forty percent water and sixty percent solids has very little odor right after slaughter. The offensive odors start about an hour or so after exposure to the air at ordinary room temperature. The offensive odors can be reduced by washing it with a large volume of water, by adding chemicals, and putting it into airtight containers. However, it becomes apparent that the inventor is faced with several problems such as:

1. If paunch content is washed with a larger volume of water it reduces odors but it also washes away high economic value proteins and other nutrients dissolved in the paunch juice. The washing water also pollutes streams.

2. If paunch content is treated with chemicals to kill odor causing bacteria such chemical or reaction products therefrom may remain in the processed paunch content product which may be harmful to livestock when fed. Discharging used chemicals also pollutes streams, and 3. If attempted to contain paunch content in airtight containers without treatment the cost for such containers and land area needed for such a vast volume be nearly prohibitive.

OBJECTS OF THE PRESENT INVENTION

The principal objects of the present invention are to:

1. Precipitate proteins and other nutrients in the paunch content;
2. Add urea which act on cellulose which bacteria can convert it into proteins;
3. Dewater and ensil the treated paunch content to kill aerobic bacteria; and
4. Recycle the used precipitating agent and protein supplement to avoid pollution.

DESCRIPTION OF THE INVENTION

This invention relates to a processing technique for the conversion of paunch content into a useful product as follows:

Chemicals used in this invention are one-half of one percent (.5%) to three percent (3%) trichloroacetic acid which acts as a protein precipitating agent and also as a bacteriostatic agent, and one percent (1%) to five percent (5%) urea which act on cellulose and serves as a protein supplement and also acts as a bacteriostatic agent. Equipment used in this invention are water proof collecting tanks, presser for dewatering, and airtight containers to store the treated product for a few days.

Paunch content as it comes off the slaughter house operation is mixed with a solution comprised of said precipitating agent and said protein supplement in the ratio of one (1) part of paunch content to one (1) to two (2) parts of said solution by volume and conveyed to the collecting tank. When the treated paunch content has filled to capacity of the presser which is placed within the collecting tank the said paunch content is dewatered to about sixty percent (60%) to seventy-five percent (75%) moisture content and ensiled in the desired size containers to create an anaerobic condition and stored for few days. The used solution comprised of precipitating agent and protein supplement left on the bottom of the presser tank is re-adjusted to the original concentration and recycled. In the process the precipitated proteins and other nutrients in the aqueous suspension are recovered with the paunch residue. Finally the treated paunch content is ensiled to preserve under anaerobic condition.

I claim:

1. A method of processing the whole paunch content, the process comprising the following steps:
    (a) preparing an aqueous solution comprising a precipitating agent, and protein supplement, said precipitating agent is one-half of one percent (.5%) to three percent (3%) trichloroactic acid and said protein supplement is one percent (1%) to five percent (5%) urea;
    (b) adding the whole paunch content to said aqueous solution in a volumetric ratio of approximately one part of said paunch content to one to two parts of said aqueous solution, thus forming a mixture of the proteins and other nutrients are in precipitated state, and many of the bacteria are killed; and
    (c) pressing said mixture to separate said precipitates with said residue from aqueous solution.

2. The process of claim 1 wherein said precipitate with residue after pressing has moisture content of approximately sixty percent (60%) to seventy-five percent (75%).

3. The process of claim 1 wherein said precipitating agent and said protein supplement are readjusted to the original concentration and recycled after each use.

References Cited

UNITED STATES PATENTS

| | | | |
|---|---|---|---|
| 1,071,218 | 8/1913 | Dyck | 426—212 |
| 2,510,543 | 6/1950 | Borsook | 426—335 |
| 2,160,167 | 5/1939 | Pfeiffer | 426—227 |
| 3,767,416 | 10/1973 | Lee | 260—112 R |

OTHER REFERENCES

Chem. Abstracts, vol. 52, 4717c, 1958.

NORMAN YUDKOFF, Primary Examiner

H. H. BERNSTEIN, Assistant Examiner

U.S. Cl. X.R.

260—112 R; 426—69, 328, 480, 807; 424—317